CARBOXYLIC ELASTOMERS

Verle A. Miller, Robert R. Brown, and Edwin B. Gienger, Jr., Dover, Del., assignors to International Latex Corporation, Dover, Del., a corporation of Delaware
No Drawing. Filed Nov. 28, 1958, Ser. No. 776,730
14 Claims. (Cl. 260—78.3)

This invention relates to synthetic rubber compositions and their manufacture, and more particularly to high strength, carboxylic elastomers which possess advantageous combinations of developed properties in regard to tensile strength, modulus, elongation, tear strength, and low temperature flexibility. The invention also pertains to new carboxylic acid monomers copolymerizable with conjugated dienes, and to methods for preparation of such monomers.

Elastic synthetic rubber compositions of the conjugated diene type containing carboxyl groups pendant from the linear polymer chains have been developed, which unlike other synthetic rubbers possess high tensile strength in the unreinforced or pure gum condition when such polymers are cross-linked with polyvalent metal cations. This results in the formation of polymeric metallo-carboxylates in which the linear conjugated diene polymer chains are connected to each other by a plurality of salt group cross-links or primary valence units consisting of carboxyl groups and a divalent metal which may be illustrated as follows:

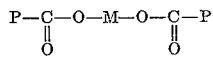

where M is a divalent metal and P is a linear conjugated diene polymer chain containing the pendant carboxyl groups.

Although the presence of carboxyl groups themselves at sufficient carboxyl content in the polymer will impart increased tensile strength, and monovalent ions, e.g. alkali metals, impart a degree of cure to the polymer, cross-linking of the polymer with divalent metallic ions, such as zinc, and calcium, establishes a much stronger chain association and imparts high gum tensile strength (tensile strength of unloaded vulcanizate). The tensile strength increases with the COOH content of the polymer when the polymer is cured with sufficient polyvalent metal cross-linking agent. The curing or vulcanizing action of the polyvalent metal salt-forming reaction establishes a "tight" cure due to the "fixed" position of the polar cross-links when the pendant carboxyl groups are directly connected to carbon atoms in the linear polymer chains. This "tight" cure provides high tensile, but also inherently results in a pronounced increase in modulus of elasticity. This high modulus accompanying the high tensile strength is thus characteristic of those carboxylic elastomers in which the cross-linked carboxyl groups are directly connected to a carbon atom in the conjugated diene linear polymer chain, for example, in butadiene-methacrylic acid copolymers where the carboxyl group is in alpha position to the olefinic double bond of the methacrylic acid which enters into the addition polymerization reaction with the conjugated diene.

For certain applications, it is desirable to obtain high tensile and tear strength without high modulus, in order to diminish the force necessary to stretch or elongate the elastic article. This would more nearly approximate the high tensile strength and flexibility or elongation characteristics of natural rubber gum vulcanizates.

In other applications, the highest modulus obtainable is desirable along with high tensile strength where maximum resistance to elongation or stretching of the elastomer is required. Control of such properties through polymer composition to obtain either low or high modulus with high tensile has not been accomplished with the carboxylic elastomers heretofore developed.

The present invention accomplishes this advantageous control of properties by providing new conjugated diene-carboxylic acid elastomers of the polymeric metallo-carboxylate type in which the pendant carboxyl groups, which form the metal salt group cross-links between linear polymeric chains are contained in side chains having at least three atoms between the carboxyl group and the linear polymer chain. These elastomers are also characterized by a nitrile content in the main polymer chain by reason of inclusion of an ethylenically unsaturated nitrile in the monomer mixture from which the polymers are prepared, which contributes to development of improved flexibility and low temperature properties by effecting a more uniform distribution of the carboxyl groups in the polymer. The invention also provides polymerizable ethylenically unsaturated carboxylic acids, either mono or polyolefinic and mono or polybasic, which are copolymerizable with conjugated dienes and the nitrile to form the carboxylic polymers and metallo-carboxylates having the above-described structure, and to methods of synthesis of such acid comonomers.

The improved synthetic elastomer compositions are prepared in accordance with the invention by effecting polymerization of one or more of the acid comonomers, at least one conjugated diene, and one or more ethylenically unsaturated nitriles to obtain a plastic polymer containing the desired carboxyl content, or COOH equivalent per 100 parts of rubber, and then reacting the resulting polymer with a polyvalent metal cation-supplying substance to cross-link the polymer by salt group formation to produce a strong elastic synthetic gum rubber with or without additional vulcanization with sulfur or other conventional vulcanizing agents.

The conjugated dienes suitable for use in preparing these polymers include the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3, and other hydrocarbon homologs of butadiene-1,3 and in addition the substituted dienes such as 2-chloro butadiene-1,3, 2-cyano butadiene-1,3, the straight chain conjugated pentadienes, the straight- and branch-chain conjugated hexadienes and others. The butadiene-1,3 hydrocarbons and particularly butadiene-1,3 are preferred, because they produce stronger and more desirable polymers. The term diene hydrocarbon as used in the claims is inclusive of the above-mentioned compound, that is, both unsubstituted and substituted diene hydrocarbons.

The unsaturated nitrile may be any nitrile copolymerizable with the diene and acid, preferably low molecular weight nitriles such as acrylonitrile and its homologs or substituted derivatives, for example, alpha-chloroacrylonitrile, methacrylonitrile, and ethacrylonitrile.

The ethylenically unsaturated carboxylic acids of the invention are those having (1) an activated double bond necessary for addition copolymerization with the conjugated diene attached to a terminal methylene or a substituted methylene group, RCH=C<, where R is preferably hydrogen, but may be alkyl, aryl, alkenyl, carboxyl, or carboxylic ester, (2) a chain of at least three atoms between the carbon-carbon double bond and a carboxyl group in the acid molecule, and (3) in which the atom of the carboxyl group-containing chain alpha or adjacent the carbon-carbon double bond forms a part of a strongly polar group, such as

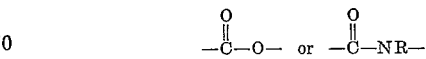

in which R is preferably hydrogen or alkyl, but may be aryl, thienyl or furyl, to insure activation of the olefinic carbon-carbon double bond so that it will readily enter into free radical-initiated addition polymerization with the conjugated diene. The separation of the carboxyl group and the activated olefinic double bond of the acid monomer effectively provides a lengthening of the side chain pendant from the linear polymer chain when the acid comonomer is polymerized with the conjugated diene to form the linear polymeric structure.

It is a primary advantage of the invention that the carboxyl content in the polymer and the type of intervening groups in the carboxyl group-containing side chain of the acid provide a means of controlling polymer properties. Thus, the polymers of the invention with either non-polar or polar groups in the carboxyl group-containing side chain provide tensile strengths comparable to the methacrylic acid type polymers at lower carboxyl contents and at advantageously lower modulus and higher elongation. The longer cross-links in the metallocarboxylate polymer apparently "loosen" the cure and provide a lower modulus, but retain the high tensile strength characteristic of the carboxylic elastomers even at low carboxyl content. This lower modulus provides a more flexible polymer and results in decidedly improved low temperature properties. In addition, the increased length of the side chain in the cross-linked polymer permits a more extensive degree of cross-linking between the carboxyl groups of the linear polymeric chains without unduly increasing the modulus so that sufficient elongation may be attained to reach a greater degree of orientation or crystallization, thereby materially improving the tear resistance of the elastomer.

On the other hand, where the acid comonomer has essentially recurring polar groups linking the free carboxyl group to the activated olefinic double bond portion of the acid molecule, the cross-linked or metal salt vulcanized polymers are characterized by higher modulus and higher tensile strength than methacrylic acid polymers of equivalent carboxyl content.

In either case, the polymers of the invention at lower carboxyl contents advantageously provide tensile strength comparable to that of polymers in which the COOH group is directly connected to the linear polymer chain. Stated otherwise, the extended chain acid monomers may advantageously be charged in lower amounts based on carboxyl content equivalent to a given amount of methacrylic acid or other acids used to form carboxylic elastomers in which the COOH group is directly connected to a carbon atom of the carbon-to-carbon double bond which enters into the addition polymerization reaction.

In general, the carboxylic acids suitable as acidic comonomers for the production of the improved polymeric carboxylic elastomers of the invention may be represented by the following formula:

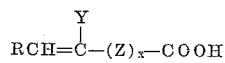

in which R is preferably hydrogen, but may be alkyl, aryl, alkenyl, carboxyl, or carboxylic ester;

Y is preferably hydrogen, alkyl, aryl or alkaryl, but may be carboxylic ester, keto, carboxyl, aldehyde, hydroxy, halogen, cyano, sulfo, thienyl or furyl;

Z is a divalent polar group-containing radical, such as carboxylic ester (—COOR—), substituted amido (—CONHR—)

or (—CONRR$_1$), in which R is a divalent radical, preferably alkylene or substituted alkylene, such as methylene or substituted methylene; but may be arylene, thienylene, furylene, and alkyl aryl substituted homologs thereof, and R$_1$ is preferably alkyl, but may be aryl, thienyl or furyl; and $x$ is any whole number not less than 1 and up to about 10, preferably not more than 5.

Among the various types of acid comonomers suitable for preparation of the polymers of the invention, those in which the double bond activating group in the carboxyl-containing side chain is an ester group and which have the structure indicated by the following formula are preferred:

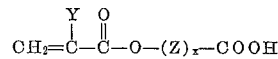

in which Y is preferably hydrogen, alkyl, aryl or alkaryl;

Z is a divalent radical, preferably non-polar, such as alkylene, or substituted alkylene, e.g., methylene or alkyl substituted methylene, but may be arylene, furylene or thienyl, or a divalent polar group-containing radical, such as —RCOOR— where R is preferably alkylene, or alkyl or aryl substituted alkylene; and $x$ is a whole number not less than 1 and preferably at least 2.

The extended side chain carboxylic acid comonomers of the invention may be prepared in various ways, among which may be mentioned the reaction of an hydroxy or amino carboxylic acid with an anhydride or acid chloride of an ethylenically unsaturated acid, either mono or polyolefinic, which is copolymerizable with a diene, for example, an acid of the acrylic acid series, such as acrylic or methacrylic acid.

As a further feature of the invention it was found that the lactone or inner ester-forming type of hydroxy acids, such as beta hydroxypropionic, gamma hydroxy butyric, valeric, caproic and other homologous acids of the lactic acid series could be reacted in the lactone form with an alkali metal salt of the ethylenically unsaturated acid or the free acid itself, for example, sodium methacrylate, or methacrylic acid, to form the desired olefinically unsaturated copolymerizable acid comonomers with extended chain between the free carboxyl group and an olefinic double bond, for example, methacryloxy-substituted fatty acids, such as beta-methacryloxy propionic acid.

The hydroxy carboxylic acids utilized to prepare the ethylenically unsaturated polymerizable acid monomers of the invention may be either mono or polybasic, and either aliphatic, that is, acyclic, or aromatic or hydroaromatic, that is, cyclic. The aliphatic acids which are suitable may range from the simplest, such as glycolic (hydroxy acetic) through the entire range of the fatty acid series, such as lactic (-hydroxypropionic acid), hydroxy butyric, hydroxy valeric, hydroxy caproic and various other higher molecular weight hydroxy aliphatic acids such as hydroxy capric, hydroxy undecylic, hydroxy myristic, hydroxy palmitic, and hydroxy stearic. The various isomeric forms of these hydroxy acids are included, that is, acids in which the hydroxy group is present in the alpha, beta, gamma, delta or any other positions farther removed from the carboxyl group, including the omega position. Polybasic as well as monobasic acids are suitable, such as tartronic (hydroxy malonic), malic, citric, hydroxy glutaric, hydroxy glutaconic and other acids of the tartronic series and higher molecular weight homologs thereof. Also polyhydroxy acids may be utilized, such as glyceric, tartaric, gluconic, their isomers, and homologs.

The unsaturated carboxylic acid comonomers may also be prepared from aromatic and hydroaromatic hydroxy carboxylic acids in which the carboxylic acid group is either attached to the ring or is present in a side chain. As examples of such cyclic acids, there may be mentioned salicylic, hexahydrosalicylic, p-hydroxy benzoic, hydroxy naphthoic and partially hydrogenated hydroxy naphthoic acids, and acids having the hydroxy substituent in the side chain such as mandelic, tropic, o-hydroxy methyl benzoic.

Among the ethylenically unsaturated acids, which in their anhydride or acid chloride form, are suitable for reaction with hydroxy carboxylic acids to form the acid comonomers there may be mentioned acrylic acid and the higher homologs thereof, such as methacrylic acid, ethacrylic acid, propyl acrylic acid, isopropyl acrylic acid; as well as other α-substituted acrylic acids, such as α-chloro-, α-cyano-, α-sulfo-, α-phenyl-, α-furyl-, α-thienyl- and vinyl acrylic acids. α-Methylene dicarboxylic acids, such as itaconic acid, and their monoesters are also included. β-Substituted unsaturated acids may also be used. Examples of this type of unsaturated acid include such dibasic acids as maleic, fumaric, and their monoesters, and monobasic acids such as, cinnamic, sorbic and crotonic acids.

Where it is desired that the activating group adjacent to the carbon-carbon double bond of the acid comonomer be of the amido group type, such comonomers may be prepared by reaction of the anhydride or acid chloride of the ethylenically unsaturated acid with an amino aliphatic, aromatic or hydroaromatic carboxylic acid in which the amino group takes the place of the hydroxyl group, and the activating polar group becomes

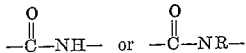

where R is preferably alkyl, but may be aryl, furyl or thienyl.

Such amino acids may be of the same type and nature as the hydroxy carboxylic acids described above, and may be of the primary or secondary amine type, for example, glycine (aminoacetic acid), alanine (α-amino propionic acid), phenylalanine, leucine, aspartic acid, and glutamic acid, and N-alkyl and aryl substituted derivatives thereof.

Of the acid comonomers above-described, those which have essentially non-polar groups in the linkage between the carboxyl group and the hydroxy group are preferred. This provides more flexible metallo-carboxylate polymers having a lower modulus and greater elongation, combined with higher tensile and tear strength and improved low temperature properties than similarly cross-linked butadiene-methacrylic acid polymers of equivalent carboxyl content. Alternatively, the polymers of the invention provide tensile strength comparable to the butadiene-methacrylic acid polymers at lower carboxyl content along with the other improved properties.

On the other hand, where the development of higher tensile strength together with higher modulus at equivalent carboxyl content is the desired result, it is preferred to use acids in which the chain between the carboxyl and the hydroxyl groups comprises essentially polar groups, for example, those having recurring ester- or amido-type linkages. For this purpose, it is a preferred and further feature of the present invention to provide novel unsaturated acid comonomers which are copolymerizable with the conjugated diene and are characterized by recurring ester groups between the free carboxyl group of the acid and the carbon-carbon double bond, as represented by the following formula:

$$CH_2=C-(C-OR)_x-COOH$$
$$\phantom{CH_2=}|\phantom{-(}\|$$
$$\phantom{CH_2=}Y\phantom{-(}O$$

where Y is hydrogen, alkyl, aryl or alkaryl;

R is preferably alkylene, such as methylene and alkyl substituted methylene, but may be arylene, furylene, thienylene; and x is at least 2, preferably at least 3 and not more than 5.

Such recurring ester groups apparently at sufficient carboxyl content in the polymer provide a plurality of secondary valence bonds considerably reinforcing the polymer with the result of higher modulus and higher tensile in the metal salt cross-linked polymers compared to methacrylic acid type polymers of equivalent carboxyl content.

The synthesis of the acid comonomers with recurring ester groups may be performed by linear condensation of lactic acid and other hydroxy aliphatic acids resulting in the formation of polymers of the acid, such as mixtures of dimers, trimers and tetramers. These homopolymerized hydroxy acids, containing an average of three acid units, were found to react with the acid chloride of the ethylenically unsaturated acids, as above described to provide highly polar copolymerizable ethylenically unsaturated acid comonomers. For example, α-[α-(α-methacryloxypropionoxy) propionoxy] propionic acid was prepared by reaction of methacrylyl chloride with polylactylactic acid (a mixture containing an average of three lactic acid units per molecule),

PREPARATION OF POLYMERS

As indicated above, the carboxylic elastomers of the invention are produced by copolymerizing a conjugated diene, an ethylenically unsaturated nitrile, and an olefinically unsaturated carboxylic acid monomer, as previously described. Although such polymers may be prepared by solution polymerization, they are more readily prepared in aqueous dispersion or emulsion. The proportions of the comonomers may be widely varied, but as the charge of acidic monomer is increased, the properties of the polymer change from those of an elastomer to those of the plastic, and therefore the preferred polymers of the invention contain at least about fifty percent (50%) of the conjugated diene. Without limiting the invention in regard to the proportion of acid in the monomer mixture, it is a distinct advantage that the desired results are obtained with small quantities, for example, from about 1 to 10% by weight of acid, and amounts within this range are preferred, while recognizing the acid may be present in any minor amount. The preferred nitrile comonomer may be present in any minor amount, for example from 5 up to about 45%, the preferred amounts in terms of polymer homogeneity and uniform carboxyl group distribution being from about 20 to 40%.

It is a further advantage of the present invention that as the chain length between the acid group and the olefinic double bond of the acid comonomer is lengthened, the emulsion polymerization is not limited to an acid medium, but the polymerization may be conducted in an alkaline medium. This permits the use of ordinary fatty acid soap type emulsifiers, such as the water soluble soaps derived from fatty acids containing between 10 and 20 carbon atoms, such as sodium or potassium salts of lauric, myristic, palmitic, oleic and stearic acids, and mixtures of such acids. However other anionic emulsifiers, and also cationic and non-ionic emulsifiers may be utilized. Suitable emulsifiers include the ethers and esters of polyglycols with aliphatic acids having from 10 to 20 carbon atoms; alkyl sulfonates or sulfates and alkaryl sulfonates where the alkyl group contains from 10 to 20 carbon atoms, alkaryl polyether sulfates or sulfated monoglycerides and similar emulsifiers that will occur to those skilled in the art. A particularly effective type of emulsifier has been found to be the amine salts of alkaryl sulfonates. The polymerization system may also include small amounts of stabilizers known to the art. The polymerization reaction may be promoted by the addition of free-radical yielding initiators such as the alkali persulfates, percarbonates, perborates and the like, organic peracids, such as benzoyl peroxide, acetyl peroxide, and the like, alkyl peroxides such as di-t-butyl peroxide and organic hydroperoxides, such as diisopropylbenzene hydroperoxide. Redox systems of initiation may be employed utilizing the above-mentioned substances with suitable reducing agents well known in the art. The polymerization mass may also contain small amounts of the sulfhydryl-group-containing compounds termed "modifiers" in the synthetic rubber industry, such as alkyl mercaptans containing from about 10 to 22 carbon atoms, e.g. n-dodecyl mercaptan, the commercially available mixed tertiary mercaptans containing from 12 to 16 carbon atoms, thiophenol, alpha- or beta-thionaphthol and the like. The polymerization can be effected within a wide range of temperatures; for example, within the range from 5° to 70° C. The above method conveniently results in the formation of polymer in the form of a latex or suspension of small drops or globules.

The polymers may be used in latex form for deposition of films, or coagulated to provide dry rubber for mill stocks.

CROSS-LINKING

The polymeric metallo-carboxylate elastomers of the invention are formed by mixing the plastic rubber carboxyl-containing polymer with a substance supplying a polyvalent metal ion in any conventional manner, such as on the mill or in a Banbury type internal mixer, or by mixing an aqueous dispersion of the metal-supplying substance in non-ionic form with the polymer in latex form and coagulating the mixed dispersion, or depositing it as a film.

The polyvalent metal oxides or hydroxides which may be utilized are those of calcium, which is preferred, zinc, magnesium, beryllium, cadmium, lead, mercury, titanium, aluminum, barium, strontium, copper, tin, nickel and, mixtures of these oxides or hydroxides.

The amount of metallic cross-linking agent required for efficient cure of the acid polymer compositions varies, depending on the curing agent used and the carboxyl content of the polymer. Metallic oxide or hydroxide at least chemically equivalent to the carboxyl content of the polymer produces better properties and it is generally preferred, for optimum properties to utilize amounts of curing agent in excess of stoichiometrical proportions.

The metal salt-forming reaction occurs with greater ease than, for example, the reaction involved in sulfur vulcanization of unsaturated polymeric materials. It is generally desirable to heat the mixture of curing agent and polymer, although the curing reaction will occur slowly at room temperature. Temperatures from 125 to 400° F., for rapid curing without too violent a reaction. The reaction usually goes to completion in from 5 or 10 minutes to 2 hours at these temperatures.

The cross-linked polymers are strongly elastic and remain thermoplastic, so that if it is desired, the rubber may be further cured by ordinary sulfur vulcanization.

The invention is further illustrated in the following examples and tabular data showing the preparation of typical monomers, polymerization of typical polymers and the physical properties of the cross-linked metallo-carboxylate polymers with comparative data on carboxylic elastomer of the prior art typical of those in which the carboxy group is directly connected to the polymer chain, namely butadiene, acrylonitrile, methacrylic acid terpolymers. The examples are not to be construed as a limitation of the invention, but merely illustrative of complete specific embodiments thereof. The folowing abbreviations are used to identify the monomers for the purpose of simplifying the tabulations:

AN=acrylonitrile
BD=butadiene
MAA=Methacrylic acid
α-MAOPA=α-methacryloxypropionic
B-MAOPA=beta-methacryloxypropionic acid
α,α-MAOPOPA=alpha-(alpha-methacryloxypropionoxy) propionic acid
α,α,α-MAOPOPOPA=alpha-[alpha-(alpha-methacryloxypropionoxy) propionoxy] propionic acid
B,B-MAOPOPA=beta-(beta-methacryloxypropionoxy) propionic acid
B,B,B-MAOPOPOPA=beta-[beta-(beta-methacryloxypropionoxy) propionoxy] propionic acid Unless otherwise noted, all reference to parts or percentages in the examples refer to parts or percentage by weight.

ACID MONOMER PREPARATION

Example I

α-METHACRYLOXYPROPIONIC ACID 391.6 grams (3.75 mols) of methacrylyl chloride is added drop-wise with vigorous stirring to a dry mixture of 270 grams (3 mols) of lactic acid and 6 grams cuprous chloride as a polymerization inhibitor. The mixture is heated on a water bath at 80° C. during addition of the methacrylyl chloride and for an additional 2½ hours. The reaction mixture is distilled to remove unreacted methacrylyl chloride (about 57 grams). The residue of crude product weighs 535 grams and contains a solid precipitate of cuprous chloride. The liquid is decanted from the precipitate and divided into two portions of 169 grams and 142 grams, respectively. The first portion is washed five times with 100 ml. increments of water, the second portion being washed with two additional 800 ml. portions of water. The organic layers are separated and samples titrated with alkali, obtaining a neutralization equivalent of 158 corresponding to that calculated for pure methacryloxypropionic acid. The organic layers are treated with $MgSO_4$ to remove turbidity due to retained moisture. The yield of purified alpha-methacryloxypropionic acid is about 80%.

Example II

12-METHACRYLOXY STEARIC ACID 12-methacryloxy stearic acid is prepared in good yield by reaction of methacrylyl chloride and 12-hydroxy stearic acid in accordance with the procedure of Example I.

Example III

BETA-METHACRYLOXYPROPIONIC ACID

The beta isomer of methacryloxypropionic acid is prepared by reaction of sodium methacrylate with propiolactone according to the following procedure: 108 grams (1 mol) of sodium methacrylate was dissolved in 300 ml. of water in a suitable reaction vessel, and 72 grams (1 mol) of propiolactone was added drop-wise, the temperature of the mixture being maintained from 20 to 25° C. for about 3 hours after completion of propiolactone addition. An organic layer was separated after cooling to 0–5° C. and addition of 110 ml. of 36% HCl and 100 ml. water. The organic layer weighed 159 grams after washing with two 100 ml. portions of water and separation from the aqueous phase. The final recovery of 140 grams of organic product provided a yield of 72% based upon the molecular weight of beta-methacryloxypropionic acid of 158.

Example IV

N-METHACRYLYL-ε-AMINOCAPROIC ACID 54 grams (½ mol) of sodium methacrylate was dissolved in 100 ml. of water added to a ½ liter flask provided with water cooled reflux condenser and 56.5 grams (½ mol) of caprolactam and 1 gram of cuprous chloride, as polymerization inhibitor, were added to the sodium methacrylate solution. The mixture was heated at 90 to 100° C. for about 5 hours. The reaction mixture was treated with ½ mol of HCl after filtering off the insoluble cuprous chloride. An organic layer weighing 65 grams was separated and washed several times, and upon final separation provided a total organic product which yielded about 76% N - methacrylyl - aminocaproic acid.

Example V

PREPARATION OF ACID COMONOMER WITH RECURRING ESTER GROUPS

This is a typical illustration of those acid comonomers of the invention with recurring polar groups (in this instance recurring ester groups) in the carboxyl-containing side chain of the acid molecule.

Upon subjecting lactic acid to prolonged heating under vacuum of 10–50 mm. at reflux temperature to remove water, condensation occurs with the formation of polylactyllactic acids containing an average of about three propionoxy groups. This mixture of polymeric acids is reacted with methacrylyl chloride and the product worked up in the same manner as described in Example I. Titration of samples of the washed product with alkali showed it to have a neutralization equivalent of 300–325, which corresponds closely to the calculated equivalent of 302 for α-[α-(α-methacryloxypropinoxy)] propionic acid. Thus, the product is not the pure acid, but a mixture of acids having an average neutralization equivalent closely corresponding to the above-named acid.

POLYMER PREPARATION

The following examples illustrate typical preparation of polymers of the invention in which butadiene 1,3, acrylonitrile, and the selected carboxylic acid comonomer are copolymerized in aqueous emulsion.

Example VI

An aqueous solution of 150 parts of water, 4 parts of Ultrawet 35KX emulsifier, an alkylated sodium benzene sulfonate, .05 part of a chelating agent (ethylenediamine tetracetic acid), and .05 part of potassium persulfate as the free radical polymerization initiator was first placed in the reaction vessel. 0.4 part of a modifier (mixed tertiary $C_{12}$–$C_{16}$ mercaptans) was then placed in the reaction vessel followed by 40 parts of acrylonitrile, and 5.5 parts of alpha-methacryloxypropionic acid. 54.5 parts of liquid butadiene 1,3 were then added to the reaction vessel after the same had been purged of air. The reaction vessel was brought to 50° C. while the reaction mixture was agitated to form an emulsion. The polymerization mixture reached approximately complete (95%) conversion in 4½ hours at 50° C., after which the agitation was stopped and the unreacted monomers and some water were removed by vacuum stripping. The remaining emulsion had a solids content of about 40% expressed as weight of dry solids based on total weight of the emulsion. Alkalimetric titration of the polymer after removal of unreacted monomers gave 5.1 parts of acid in the polymer indicating essentially all of the acid monomer charged entered the polymer. The resulting acid latex was neutralized by addition of concentrated (28%) ammonium hydroxide to pH of about 8.5. After coagulation with sodium chloride solution and subsequent washing, the plastic polymer was compounded on a rubber mill with a stoichiometric excess of Ca(OH)$_2$ as the only curing agent with heating to 300° F. for 45 minutes.

Similar polymers varying in monomer proportions of α-methacryloxypropionic acid, acrylonitrile and butadiene 1,3 were prepared by the above procedure as follows:

| BD | AN | MAOPA |
|---|---|---|
| 54.5 | 40 | 5.5 |
| 56.3 | 40 | 3.7 |
| 52.5 | 40 | 7.5 |
| 82.5 | 10 | 7.5 |
| 61.6 | 20 | 18.4 |
| 40 | 40 | 20 |

Example VII

Ter polymers containing various amounts of beta-methacryloxypropionic acid, acrylonitrile and butadiene 1,3 were also prepared in the manner set forth in Example VI as follows:

| BD | AN | Beta MAOPA |
|---|---|---|
| 53.5 | 40 | 6.5 |
| 54.5 | 40 | 5.5 |
| 67 | 20 | 13 |

Example VIII

The recurring ester group acid comonomer of Example V was copolymerized with butadiene and acrylonitrile in the manner set forth in Example VI, the monomer charges being 75 parts butadiene 1,3, 20 parts acrylonitrile, and 5 parts acid, and 40 parts butadiene, 40 parts acrylonitrile and 20 parts of acid in different runs. Polymerization proceeded to substantially complete conversion in 7 to 8 hours. Titration of the polymer showed acid contents of 4.95 and 20.2 parts, respectively, indicating that the acid comonomer entered the polymer in substantially the same ratio as charged.

POLYMER PROPERTIES

Polymers prepared as above-described and cured by cross-linking with Ca(OH)$_2$ and ZnO were evaluated as milled stocks or dipped films with the results indicated below.

The marked effect of the extended carboxyl-containing side chain in the polymeric metallo-carboxylates of the invention is clearly illustrated in the Tables, which set forth physical properties of the mill compounded pure gum stocks in comparison to similarly cross-linked and compounded butadiene-methacrylic acid polymers. The compositions of the copolymers are indicated in percentage by weight of the total monomer charge with identification of the cross-linking agent, curing cycles, and other components, if any, in the mill compounding of the stock.

Table I

GUM VULCANIZATE PROPERTIES AT EQUIVALENT COOH CONTENT

| Polymer | Curing agent | | Modulus, p.s.i. | | | Tensile, p.s.i. | Elongation, percent | Tear strength, lbs./in. |
|---|---|---|---|---|---|---|---|---|
| | Ca(OH)$_2$ | ZnO | 100% | 300% | 500% | | | |
| BD, 54.5; AN, 40; MAOPA,[1] [2] 5.5 | 6 | | 352 | 795 | 1,470 | 3,910 | 725 | 178–180 |
| BD, 54.5; AN, 40; MAOPA,[1] 5.5 [2] | 6 | | 299 | 727 | 1,229 | 4,400 | 800 | 222 |
| BD, 54.5; AN, 40; β-MAOPA,[1] 5.5 [2] | 6 | | 347 | 774 | 1,193 | 3,530 | 975 | 181 |
| BD, 54.5; AN, 40; β-MAOPA,[1] 5.5 [2] | 9 | | 373 | 860 | 1,280 | 3,385 | 950 | 198 |
| BD, 57; AN, 40; MAA,[1] 3 | 6 | | 400 | 922 | 2,050 | 3,480 | 600 | 221–229 |
| BD, 57; AN, 40; MAA,[1] 3 | 6 | | 450 | 950 | 2,187 | 4,000 | 600 | 195–206 |
| BD, 54.5; AN, 40; MAOPA,[3] 5.5 [2] | | 3 | 216 | 412 | 841 | 2,950 | 700 | 85 |
| BD, 57; AN, 40; MAA,[3] 3 | | 3 | 291 | 675 | 1,650 | 2,125 | 525 | 130–140 |

[1] Milled stocks cured 45 minutes at 300° F. with 2 parts phenylbenzylamine antioxidant.
[2] 5.5 parts MAOPA equals 3 parts MAA in carboxy equivalents.
[3] Dipped film: Drying time 60 minutes at 150° F.; Curing time 60 minutes at 230° F.

The lower modulus and higher elongation obtainable with the polymers of the invention at carboxyl contents equivalent to a 3 part methacrylic acid polymer are clearly illustrated in the foregoing table.

However, a more important contribution of the invention is brought out in Table II below, where longer pendant chain acid polymers with lower carboxyl content are shown to have comparable or greater tensile with markedly lower modulus and much higher elongation.

Table II
GUM VULCANIZATE PROPERTIES IN MILLED STOCKS [1]
[Polymer cured 45 minutes at 300° F.]

| Polymer | COOH content in equivalent parts MAA | Ca(OH)₂ | Modulus, p.s.i. | | | Tensile, p.s.i. | Elongation, percent | Tear strength, lb./in. |
|---|---|---|---|---|---|---|---|---|
| | | | 100% | 300% | 500% | | | |
| BD, 58; AN, 40; α-MAOPA, 2 | 1.1 | 4.3 | 147 | 360 | 673 | 2,660 | 1,000 | 188 |
| BD, 57.34; AN, 40; β-β-MAOPOPA, 2.66 | 1.0 | 6.0 | 170 | 349 | 589 | 1,950 | 900 | 103 |
| BD, 57.34; AN, 40; β-β-MAOPOPA, 2.66 | 1.0 | 5.0 | 178 | 458 | 775 | 2,240 | 850 | 152 |
| BD, 56.8; AN, 40; β-β-MAOPOPOPA, 3.2 | 1.0 | 4.0 | 161 | 346 | 588 | 2,280 | 1,050 | 110 |
| BD, 56.8; AN, 40; β-β-MAOPOPOPA, 3.2 | 1.0 | 6.0 | 186 | 388 | 648 | 2,050 | 950 | 112 |
| BD, 57; AN, 40; MAA, 3 | | 3.0 | 333 | 667 | 1,680 | 2,520 | 565 | 170 |
| BD, 57; AN, 40; MAA, 3 | | 6.0 | 243 | 578 | 1,261 | 2,090 | 625 | 136 |
| BD, 57; AN, 40; MAA, 3 | | 9.0 | 292 | 704 | 1,416 | 2,220 | 650 | 146 |

[1] 2 parts phenylbenzylamine antioxidant.

Thus, at only one-third the carboxyl content compared to the methacrylic acid type polymer, the polymers of the invention provide the characteristic high tensile of the carboxylic elastomers at favorably low modulus and high elongation.

On the other hand, as shown in Table III the recurring ester group polymers at carboxyl contents equivalent to that of the methacrylic acid type polymers exhibit much higher tensile strengths and higher modulus.

Table III
GUM VULCANIZATE PROPERTIES IN MILLED STOCKS [1][2]

| Polymer | COOH content in equivalent parts MAA | Ca(OH)₂ | Modulus, p.s.i. | | | Tensile, p.s.i. | Elongation, percent | Tear strength, lb./in. |
|---|---|---|---|---|---|---|---|---|
| | | | 100% | 300% | 500% | | | |
| BD, 52; AN, 40; α-α-MAOPA, 8 | 3 | 6 | 397 | 970 | 2,130 | 3,300 | 625 | 240 |
| BD, 52; AN, 40; α-α-MAOPA, 8 | 3 | 9 | 408 | 1,126 | 2,433 | 4,250 | 650 | 247 |
| BD, 62; AN, 30; α-α-MAOPA, 8 | 3 | 6 | 412 | 1,030 | 1,855 | 2,970 | 650 | 171 |
| BD, 52; AN, 40; β-β-MAOPOPA, 8 | 3 | 9 | 356 | 894 | 1,835 | 3,490 | 675 | 182 |
| BD, 50.5; AN, 40; β-β-MAOPOPOPA, 9.5 | 3 | 6 | 326 | 803 | 1,463 | 4,350 | 825 | 207 |
| BD, 50.5; AN, 40; β-β-MAOPOPOPA, 9.5 | 3 | 9 | 396 | 882 | 1,473 | 3,980 | 825 | 212 |
| BD, 57; AN, 40; MAA, 3 | | 6 | 243 | 578 | 1,261 | 2,090 | 625 | 136 |
| BD, 57; AN, 40; MAA, 3 | | 9 | 292 | 704 | 1,416 | 2,220 | 650 | 146 |

[1] Parts phenylbenzylamine antioxidant.
[2] Curing cycle—45 minutes at 300° F.

Thus, the invention provides polymers which have wide application, both where ease of stretching with high strength (low modulus-high tensile), or high strength and resistance to stretching or deformation (high modulus-high tensile) are desired. Thus, dipped films, for example, gloves may be made of the low modulus polymers, while tire stocks may be mentioned for the high strength-high modulus polymers.

The invention may be varied in numerous ways and different modifications and alterations are contemplated without departing from the spirit of the invention, the scope of which is defined by the appended claims.

We claim:

1. An elastic polymeric composition comprising a polymer of not less than 40% by weight of a conjugated diene having from 4 to 6 carbon atoms, from about 5 to 45% of an ethylenically unsaturated nitrile copolymerizable with said diene and a minor amount of an ethylenically unsaturated carboxylic acid monomer, said monomer having a chain of at least three atoms between a carboxyl group and a carbon-to-carbon double bond, said chain having a divalent polar group adjacent said double bond, said polymer cross-linked through said carboxyl groups by a polyvalent metal.

2. A rubbery polymeric composition comprising a carboxyl-containing polymer formed from at least 50% of a conjugated diene having from 4 to 6 carbon atoms, up to 45% of an unsaturated nitrile copolymerizable with said diene, and a minor amount of an ethylenically unsaturated carboxylic acid in which carboxyl groups are pendant from the main polymer chain in side chains having at least three atoms between the carboxyl group and the main polymer chain and a divalent polar group in said side chains adjacent the main polymer chain selected from the group consisting of carboxylic ester and substituted amido, said polymer cross-linked through said carboxyl groups by a polyvalent metal.

3. An elastomeric composition comprising a carboxyl-containing polymer of not less than about 40% by weight of a conjugated diene having from 4 to 6 carbon atoms, from about 5 to 45% of an unsaturated nitrile copolymerizable with said diene, and a minor amount of an ethylenically unsaturated carboxylic monomer, said carboxylic monomer containing the vinylidene group $$CH_2=C<$$

and having a chain of at least three atoms between said group and a carboxyl group, the atom of said chain adjacent the vinylidene group forming a part of a divalent polar group, said polymer cross-linked through said carboxyl groups by a polyvalent metal.

4. A composition according to claim 3 in which the polar group is selected from the group consisting of

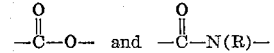

where R is hydrogen, alkyl, aryl, thienyl or furyl.

5. A composition according to claim 3 in which the balance of the carboxyl-containing chain consists essentially of non-polar groups, and the polymer is characterized by high gum tensile strength and low modulus.

6. A composition according to claim 3 in which the balance of the carboxyl-containing chain consists essentially of recurring polar groups, and the polymer is characterized by high gum tensile strength and high modulus.

7. A composition according to claim 6 in which the recurring polar groups are divalent carboxylic ester groups.

8. An elastic polymeric composition comprising a polymer of at least 50% by weight of a conjugated diene having from 4 to 6 carbon atoms, from about 5 to 45% of an unsaturated nitrile copolymerizable with said diene, and from about 1 to 10% of a carboxylic acid monomer having the formula

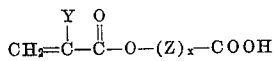

in which Y is selected from the group consisting of hydrogen, alkyl, aryl, Z is a divalent radical selected from the group consisting of alkylene, arylene, furylene, and thienylene, and $x$ is a whole number not less than 1, said polymer cross-linked through the carboxyl groups by a polyvalent metal.

9. A composition according to claim 8 in which the polyvalent metal is calcium.

10. A composition according to claim 8 in which the carboxylic acid monomer is a methacryloxy-substituted saturated fatty acid.

11. A composition according to claim 10 in which the carboxylic acid monomer is methacryloxy-substituted propionic acid.

12. An elastic polymeric composition comprising a polymer of at least 50% by weight of a conjugated diene having from 4 to 6 carbon atoms, from about 5 to 45% of an unsaturated nitrile copolymerizable with said diene and from about 1 to 10% of a carboxylic acid monomer having the formula

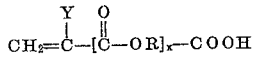

in which Y is selected from the group consisting of hydrogen, alkyl and aryl, R is a divalent radical selected from the group consisting of alkylene, arylene, furylene, thienylene, and $x$ is a whole number not less than 2 and not more than 5, said polymer cross-linked through the carboxyl groups by a polyvalent metal.

13. A composition according to claim 12 in which the carboxylic acid monomer is a methacryloxy-substituted condensation product of a hydroxy aliphatic carboxylic acid having recurring carboxylic ester groups.

14. A composition according to claim 13 in which the carboxylic acid monomer is an $\alpha$-methacryloxy-substituted condensation product of $\alpha$-hydroxy propionic acid containing an average of three propionoxy groups.

References Cited in the file of this patent

UNITED STATES PATENTS

| | | |
|---|---|---|
| 2,141,546 | Strain | Dec. 27, 1938 |
| 2,539,428 | Jansen | Jan. 30, 1951 |
| 2,626,248 | Brown | Jan. 20, 1953 |
| 2,662,874 | Brown | Dec. 15, 1953 |
| 2,726,230 | Carlson | Dec. 6, 1955 |
| 2,744,099 | Mitchell et al. | May 1, 1956 |
| 2,854,439 | Slocombe et al. | Sept. 30, 1958 |
| 2,885,434 | Cavallini et al. | May 5, 1959 |
| 2,945,012 | Berens | July 12, 1960 |